United States Patent
Vrolijk et al.

(10) Patent No.: US 9,371,931 B2
(45) Date of Patent: *Jun. 21, 2016

(54) GAS CONTROL VALVE

(71) Applicant: EBM-PAPST LANDSHUT GmbH, Landshut (DE)

(72) Inventors: Enno Vrolijk, Dalen (NL); Hans-Joachim Klink, Erolzheim (DE); Roland Keber, Wörth (DE)

(73) Assignee: ebm-papst Landshut GmbH, Landshut (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/373,444

(22) PCT Filed: Feb. 27, 2013

(86) PCT No.: PCT/EP2013/053928
§ 371 (c)(1),
(2) Date: Jul. 21, 2014

(87) PCT Pub. No.: WO2013/143800
PCT Pub. Date: Oct. 3, 2013

(65) Prior Publication Data
US 2015/0014559 A1    Jan. 15, 2015

(30) Foreign Application Priority Data
Mar. 27, 2012  (DE) .......................... 10 2012 102 646

(51) Int. Cl.
*F16K 31/04*  (2006.01)
*F23N 1/04*  (2006.01)
*G05D 16/20*  (2006.01)

(52) U.S. Cl.
CPC ................ *F16K 31/04* (2013.01); *F23N 1/042* (2013.01); *G05D 16/202* (2013.01)

(58) Field of Classification Search
CPC ....... F16K 17/205; F16K 17/32; F16K 31/04; F16K 31/047; G05D 16/202; F23N 1/042; F23N 1/045
USPC ......... 251/30.01, 81, 129.07, 129.11, 129.13, 251/129.19, 335.2; 137/505.13, 505.21
See application file for complete search history.

(56) References Cited

U.S. PATENT DOCUMENTS 3,606,241 A * 9/1971 Bornholdt ........... F16K 31/0693
251/129.07
4,662,604 A * 5/1987 Cook ................. F02M 25/0756
123/568.26

(Continued)

FOREIGN PATENT DOCUMENTS

DE           19607538 A1    8/1996
EP            1164279 A1   12/2001

(Continued)

OTHER PUBLICATIONS

International Search Report and Written Opinion for PCT/EP2013/053928, mailed Dec. 6, 2013; ISA/EP.

(Continued)

*Primary Examiner* — Matthew W Jellett
(74) *Attorney, Agent, or Firm* — Harness, Dickey & Pierce, P.L.C.

(57) ABSTRACT

The invention relates to a gas control valve for the control of a quantity of gas to be supplied to a gas burner, having a direct pressure regulator which has a valve body that can be moved by an electronically controlled stepper motor.

14 Claims, 3 Drawing Sheets

(56) References Cited

U.S. PATENT DOCUMENTS

| | | | | |
|---|---|---|---|---|
| 5,007,458 A | * | 4/1991 | Marcus | F16K 31/0634 137/625.5 |
| 5,584,467 A | * | 12/1996 | Harnett | F02D 21/02 123/527 |
| 5,632,258 A | | 5/1997 | Tsuzuki et al. | |
| 5,855,195 A | | 1/1999 | Oikawa et al. | |
| 6,116,276 A | * | 9/2000 | Grill | F15B 13/0405 137/596.17 |
| 6,848,672 B2 | * | 2/2005 | Cross | F16K 31/055 251/292 |
| 8,292,262 B2 | * | 10/2012 | Hasunuma | F16K 7/12 137/513.3 |
| 8,381,760 B2 | * | 2/2013 | Santinanavat | F16K 31/128 137/487.5 |
| 8,596,957 B2 | | 12/2013 | Seebauer | |
| 2006/0081238 A1 | * | 4/2006 | Vancak | F23C 3/002 126/92 AC |
| 2014/0242528 A1 | * | 8/2014 | Vancak | F23N 5/08 431/37 |
| 2015/0053287 A1 | * | 2/2015 | Keber | F16K 31/04 137/613 |

FOREIGN PATENT DOCUMENTS

| | | |
|---|---|---|
| EP | 2048439 A1 | 4/2009 |
| WO | WO-0190611 A2 | 11/2001 |

OTHER PUBLICATIONS

International Preliminary Report on Patentability (in German with English Translation) for PCT/EP2013/053928, issued Oct. 1, 2014; ISA/EP.

* cited by examiner

GAS CONTROL VALVE

FIELD

The invention relates to a gas control valve for controlling a quantity of gas to be supplied to a gas burner, comprising a direct pressure regulator which has a valve body that can be moved by an electronically controlled stepper motor.

BACKGROUND

Various gas control valves are known from the prior art in which the valve body is displaced by a magnetic coil, for example a plunger coil, against spring force, thus controlling the open and closed position of the valve. EP 2 048 439 A1, for example, also describes the use of a stepper motor when moving the valve body, said stepper motor acting directly on a housing part of a radial fan.

However, the disadvantage of solutions with a plunger coil as a drive mechanism is that the mechanical and magnetic hysteresis which inevitably arises causes imprecise control and leads to poor forwards accuracy when moving the valve body, which in turn leads to inaccurate gas quantities. The modulation band of a gas burner is also significantly restricted when moving the valve body in the gas control valve with magnetic coils and only poor reproducibility of the controlled gas quantity can be guaranteed. In addition, the flow rate is dependent on the pressure in the gas network, which is subject to considerable fluctuations.

In light of this problem, the object of the invention is to provide a gas control valve which allows gas burners to be operated with a larger modulation band than burners of the prior art and controls the quantity of gas to be supplied to the gas burner with a high degree of reproducibility.

SUMMARY

A gas control valve according to the invention for gas burners comprises a direct pressure regulator which has a housing with a gas inlet, a valve body held in the housing and arranged such that it can move in a first and second axial direction, said valve body abutting a valve seat when the gas control valve is in a closed position, at least one first spring, which acts permanently on the valve body in the first axial direction, and a shaft which moves in the axial direction and engages with the valve body directly or indirectly by means of a second spring, and with an electronically controlled and electrically operated stepper motor acting on the shaft, said stepper motor moving the shaft and thus the valve body in pre-defined longitudinal portions in the axial direction to open and close the gas control valve. The feature of a shaft which engages with the valve body directly or indirectly is understood to mean any design which acts on the valve body in a gas control valve in an axial direction so as to move its position, irrespective of whether said shaft is provided as an additional component or on a drive itself. The shaft is preferably made from metal.

The combination of the direct pressure regulator and an electronically controlled stepper motor in a gas control valve permits a high degree of forwards accuracy in the movement of the valve body and thus in control, as the valve body is released from the valve seat in very small steps, which can be defined exactly in advance, and moved into an open position, which can be defined exactly. Even during the control process, extremely accurate control of the movement of the valve body in both axial directions can be achieved by half-steps and full-steps of the stepper motor. Furthermore, the reproducibility of the quantity of gas regulated by the gas control valve is improved compared with drive means used to date, such as plunger coils, as there are no mechanical and magnetic hysteresis effects which always cause inaccuracies when moving the valve body and thus have a negative effect on reproducibility.

In an advantageous embodiment, the direct pressure regulator is designed such that the valve body is held in the centre of a membrane and gas is admitted in the axial direction between the membrane and the valve seat with the result that a gas pressure in the first axial direction presses against the membrane and in the second, opposite axial direction against the valve body or against portions of the valve body extending radially outwards. The valve body is thus in a force equilibrium, influenced by the spring force of the first spring, the external pressure and the gas pressure against the membrane holding the valve body in a first axial direction and the gas pressure and the force of the stepper motor on the valve body in a second axial direction.

This guarantees that only a small stroke of the stepper motor is necessary to release the valve body in a pre-defined manner from the valve seat in the second axial direction and thus release a pre-defined quantity of gas through the valve gap per unit of time. The fact that the direct pressure regulator is designed, according to the invention, with a force equilibrium allows larger passage diameters of 15-35 mm, preferably 15-25 mm, to be provided for the gas passage, with the result that the required overall lift of the valve body from the valve seat is drastically reduced and does not exceed 3-8 mm, preferably 3-5 mm. In the case of gas control valves according to the prior art, the valve needs to lift by 10 mm or more. By reducing the necessary lift in the axial direction, the stepper motor generating this axial movement can be provided in a very simple and comparatively cost-effective design, which leads to a considerable reduction in the overall costs of the gas control valve. The diameter of the housing and the size of the valve gap in the gas control valve can also be designed to be much larger than the regulators of the prior art by providing the force equilibrium, without having a negative impact on control accuracy. According to the invention, the external diameter "c" of the housing may be 30-50 mm, whilst the preferred opening width "b" of the valve gap which determines the quantity of gas flowing through the gas control valve is 2-5 mm and in particular 3-5 mm. The dimensions of the direct pressure regulator allow a modulation band which is at least 20% bigger than in the case of the gas control valves used to date.

The movement of the valve body in the second axial direction can also be controlled more accurately because a second spring is arranged between the shaft and the valve body, said spring acting on the valve body in the second axial direction. When using a stepper motor, it is then possible to control the predefined opening positions of the valve body by individual steps and half-steps by electronic means. In order to encourage a compact design, the second spring is arranged inside the hollow valve body in a preferred embodiment, said spring extending in the axial direction along the shaft of the stepper motor. In an advantageous embodiment according to the invention, the valve seat is formed by parts of the housing of the gas control valve, with the result that additional components inside the gas control valve can be omitted wherever possible and the construction can thus be designed to be as small as possible, especially in the axial direction.

An advantageous embodiment provides that the part of the housing forming the valve seat is a protrusion extending in the circumferential direction radially towards a centre line of the gas control valve. The edge region of the protrusion which points radially inwards acts as the contact face for the valve body.

In one embodiment, the direct pressure regulator can be separated from the stepper motor by a sealing plate, said sealing plate being arranged between the stepper motor and the membrane. A recess is provided in the central region of the sealing plate, the shaft extending through said recess and creating an indirect connection between the stepper motor and the valve body. The sealing plate does not seal the direct pressure regulator absolutely, only to the extent required by standards (for example, DIN-EN 13611), which state that a specific quantity of gas (less than 70 liters per hour) may escape via the recess in the sealing plate. An embodiment of the gas control valve with a sealing plate is favourable given that the stepper motor used does not itself need to be designed to be gas-tight and is thus at least 20% cheaper.

Preferably, although not restricted to the following, an embodiment of the gas control valve with a sealing plate may be provided with an attachment arranged between the direct pressure regulator and the stepper motor, the stepper motor being fixed to said attachment. A connection can be created by means of the shaft between the stepper motor and the second spring which acts on the valve body. The attachment is likewise not gas-tight and can thus be designed cost-effectively. A solution with a sealing plate and attachment is at least 20% cheaper than a gas-tight stepper motor placed directly on the direct pressure regulator. The sealing plate is preferably made from metal.

In an advantageous embodiment, the gas control valve is designed as an interchangeable module, where "interchangeable module" means that the gas control valve is an independent component which can be combined with other components. Designing the gas control valve as a module allows said control valve to be fitted onto any number of components provided for this purpose and then removed again via a suitable interface.

In a preferred embodiment, at least part of the housing is designed as a cartridge insert, it being possible for the gas control valve in the form of a module to be designed compactly and to be inserted or screwed into housings of fan devices or gas-air mixing devices. In this case it is favourable if a thread, a flange or a comparable removable fixing means is provided on the outside of the housing in the form of a cartridge insert. It is also advantageous if the components determining the gas flow or the quantity of gas are accommodated in such a cartridge insert and are thus located in the gas flow passage when the cartridge is screwed into the corresponding housing. The "cartridge insert" is in this case defined as a housing part which is suited to being inserted into another component without the need to provide any further structural measures on the other component other than adapting the shape thereof to said insert.

By using a modular design of gas control valve, the development time is reduced as the module only needs to be developed once, but can be used in a variety of end products, for example in fan housings, gas valve housings or gas-air manifolds, at a later date. In addition, the module can be manufactured separately and its function tested, the test devices for the modular gas control valve being able to be considerably smaller than those which had to be used in the prior art for the complete components, e.g. fan housings with gas control valve and safety valves arranged thereon.

It is also favourable to provide at least one shoulder on an outer surface of the cartridge insert, at least one sealing means, for example in the form of a sealing ring, being arranged on said shoulder. In a preferred solution, two shoulders are provided, the first shoulder being located in the region in which the stepper motor is placed on the direct pressure regulator and the gas control valve abuts another component (e.g. fan housing, gas valve housing) during operation, with the result that the sealing means seal the gas control valve from the component. The second shoulder is preferably located on the outside in the region of the cartridge insert, which region extends in the inside of the component in the fitted state, the shoulder abutting those parts of the component which determine the gas passage. The sealing means arranged on the outside of the cartridge insert on the second shoulder thus seal the gas passage inside the component. This ensures that the gas passage inside the component passes via the gas control valve and not outside past the cartridge insert.

DRAWINGS

Other advantageous embodiments of the invention are characterised in the subordinate claims, or are described in greater detail below with the description of the preferred embodiment of the invention with the aid of the figures, in which:

DESCRIPTION

Figure 1:
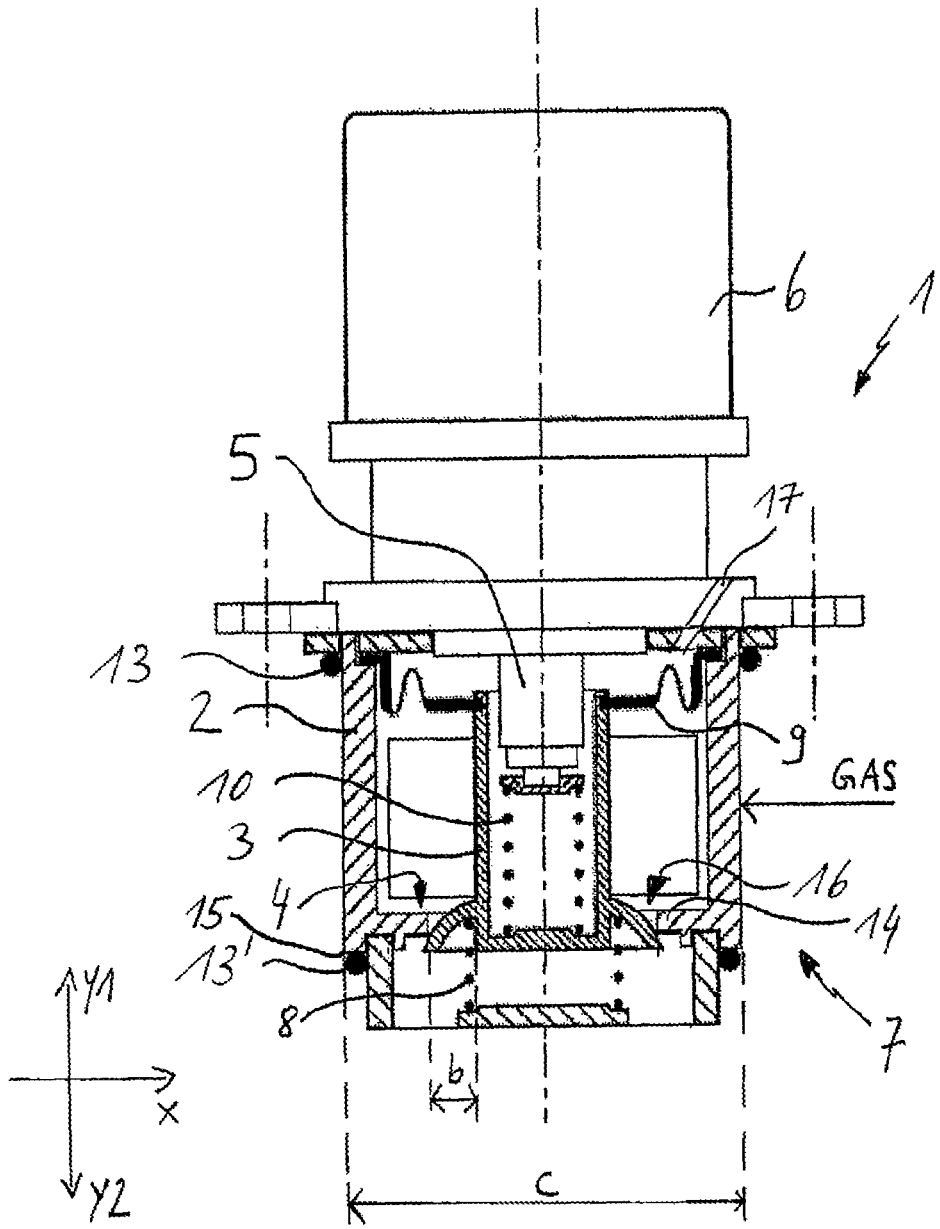
FIG. 1 is a sectional side view of a gas control valve with a gas-tight drive.

The figures show the components required in order to understand the invention in a schematic representation, by way of example, identical components being identified by the same reference numerals in each case.

FIG. 1 shows a gas control valve 1 with a stepper motor 6 arranged on a direct pressure regulator. The gas control valve 1 is designed entirely as an interchangeable module, the housing 2 forming part of the module which is inserted in the respective end product (for example a gas valve housing, fan housing, manifold) and fixed therein. The housing 2 is designed as a cartridge 7 for this purpose, said cartridge being arranged in the region of the gas passage during operation and accommodating the components regulating the quantity of gas per unit of time. A hollow valve body 3 is held in the cartridge-type housing 2 by a membrane 9, the membrane 9 being fixed to the housing 2 and forming a surface demarcation from the stepper motor 6. A compensation opening 17 permits pressure balancing in the region above the membrane 9.

The housing 2 has a protrusion 14 extending in the circumferential direction radially towards the centre line of the gas control valve, said protrusion forming the valve seat 4 for the valve body 3. A first spring 8 is arranged between the housing 2 and the valve body 3, said spring acting on the valve body 3 in the first axial direction Y1, and pressing this valve body against the valve seat 4. Gas is admitted to the gas control valve 1 in an axial direction between the membrane 9 and the valve seat 4 with the result that the gas pressure in the first axial direction Y1 acts against the membrane 9 and in the second, opposite axial direction Y2 it acts against the valve body 3 or against portions on the valve body 3 extending outwards in a radial direction. The force exerted by the gas pressure on the valve body 3 is thus applied in both axial directions Y1, Y2 and is substantially equal to zero in total. The stepper motor 6 has a shaft 5 via which a force can be applied in the second axial direction Y2 indirectly on the valve body 3 in order to move said valve body. In the illustrated embodiment, a second spring 10 extending in the axial direction is arranged inside the valve body 3, the shaft 5 of the stepper motor 6 acting on said spring in the second axial direction Y2 in order to release the valve body 3 from the valve seat 4. The force exerted by the stepper motor 6 via the second spring 10 is applied against the force of the first spring 8 and the external pressure prevailing outside the gas control valve 1. The valve body 3 experiences a force equilibrium thanks to the gas pressure forces and the spring forces, with the result that any axial movement of the shaft 5 in the second axial direction Y2 leads directly to the valve body 3 lifting accordingly from the valve seat 4. This force equilibrium makes it possible to design the diameter of the housing 2, the valve body 3 and the valve gap 16 released by the valve body 3 to be at least 5 mm in size, with the result that the absolute distance the valve body 3 has to lift from the valve seat can be restricted to 3 mm in the axial direction. The housing 2 has an external diameter of 40-60 mm, the valve body has an external diameter of 15-20 mm and the circumferential valve gap 16 (distance between the section 14 and the valve body 3) released for the gas to pass through the valve seat 4 is 5 mm in size.

Figure 2:
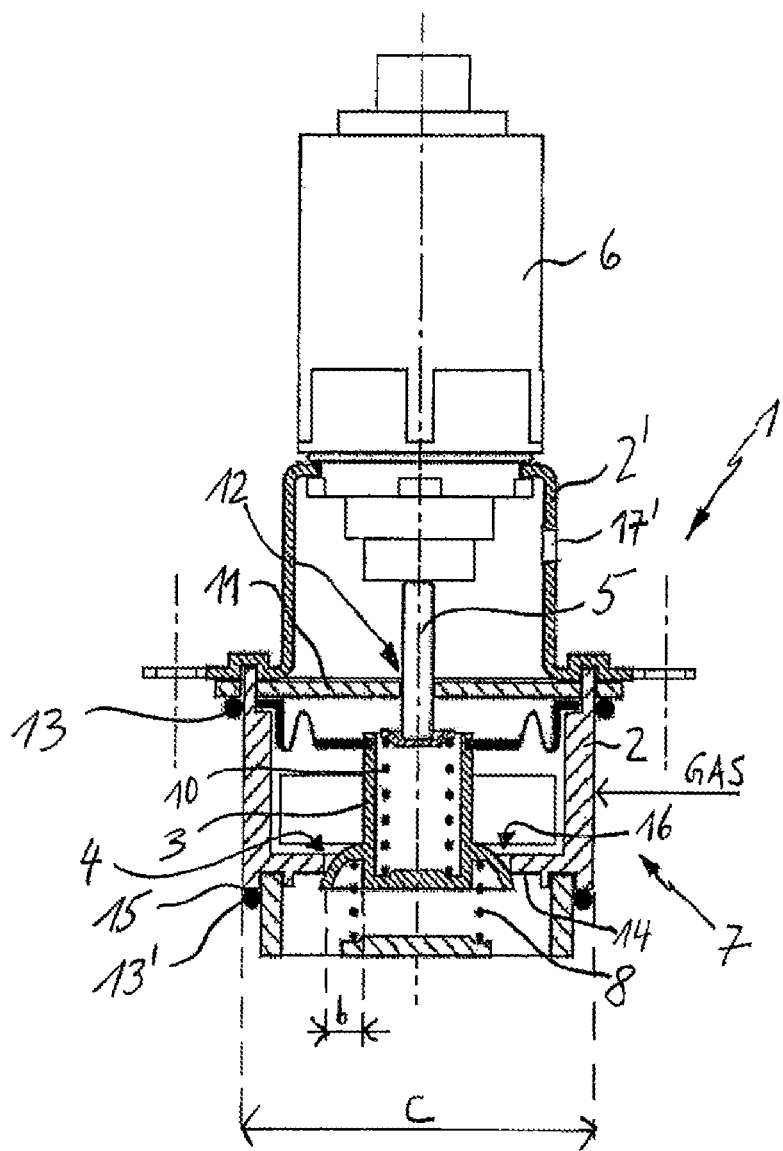
FIG. 2 is a sectional side view of a gas control valve with a non-gas-tight drive.

FIG. 2 shows the gas control valve 1 with a direct pressure regulator identical to that shown in FIG. 1, comprising the housing 2 as a cartridge 7, the valve body 3, the valve seat 4, the springs 8 and 10 and the membrane 9 arranged on the valve seat 4. Unlike the embodiment in FIG. 1, a non-gas-tight stepper motor 6 is used here, said stepper motor being fixed to the housing 2 of the gas control valve 1 by means of an attachment 2', the stepper motor 6 acting indirectly on the valve body 3 via the metal shaft 5 and the shaft 5 serving as an extension rod between the valve body 3 and the stepper motor 6. A metal sealing plate 11 is arranged between the stepper motor 6 and the membrane 3, said sealing plate having a recess 12 in the central mid-area, the shaft 5 extending through said recess. A certain quantity of gas can escape through the recess 12 in the event of error, but this is so minimal that the applicable international standards are observed. The metal sealing plate 11 is inserted into the housing 2 and fixed to the housing 2 via the attachment 2' holding the stepper motor 6. A compensation opening 17' is provided in the attachment 2' to balance the pressure. This design means that a non-gas-tight stepper motor 6 can be used, this being at least 30% cheaper than a gas-tight stepper motor. Sealing means 13, 13' are provided on the housing 2 which is designed as a cartridge insert 7, said sealing means preventing gas from escaping out past the gas control valve 1. The attachment 2' has holes on its outer side, and screws which are not illustrated can be fixed through said holes to attach the gas control valve 1 to an additional component.

Figure 3:
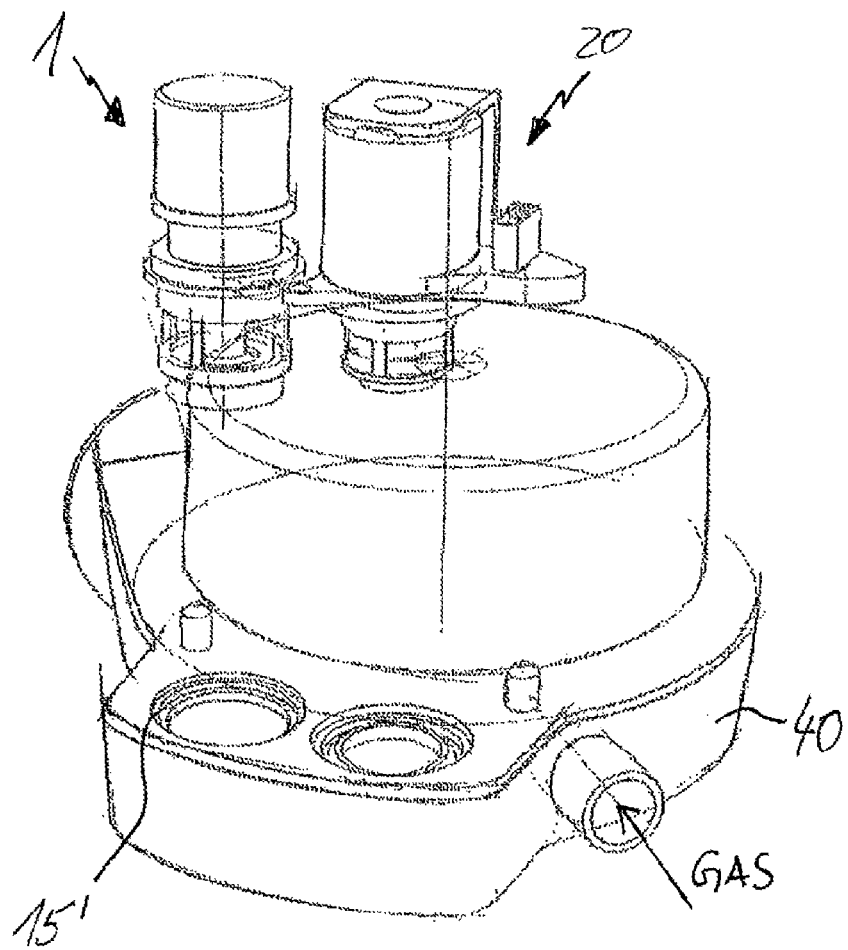
FIG. 3 is a perspective view of a fan with an insertable gas control valve with a modular design.

FIG. 3 is a perspective schematic view of the gas control valve 1 fixed in another component such that it can be released, said other component being shown in the form of a fan housing 40. Inserts 15' are provided for this purpose on the fan housing 40, it being possible for the gas control valve 1 and a gas safety valve 20 to be inserted into these inserts and fixed by means of screws. The gas-air mixture is produced directly in the fan housing 40 and then supplied to the burner.

The invention claimed is:

1. A gas control valve for controlling a quantity of gas to be supplied to a gas burner, the gas control valve comprising
   a direct pressure regulator having
   i. a housing with a gas inlet,
   ii. a valve body held in the housing, said valve body being arranged so as to be able to move in a first and second axial direction and abutting a valve seat when the gas control valve is in a closed position,
   iii. at least one first spring which acts permanently on the valve body in the first axial direction, and
   iv. a shaft which can be moved in the first and second axial directions and which engages with the valve body directly or indirectly by means of a second spring, and
   an electronically controlled stepper motor which acts on the shaft and moves the shaft and thus the valve body in pre-defined longitudinal portions in the axial direction to open and close the gas control valve;
   wherein the stepper motor is a non-gas-tight stepper motor and
   wherein the valve body is held by a membrane and gas is admitted in the axial direction between the membrane and the valve seat with the result that a gas pressure in the first axial direction acts against the membrane and in the second, opposite axial direction against the valve body.

2. The gas control valve according to claim 1, wherein the second spring is arranged between the shaft and the valve body and acts on the valve body in the second axial direction.

3. The gas control valve according to claim 1, wherein the valve body is hollow and the second spring is arranged inside the valve body.

4. The gas control valve according to claim 1, wherein the valve seat is formed by part of the housing.

5. The gas control valve according to claim 4, wherein the part of the housing forming the valve seat is a protrusion extending radially in a circumferential direction towards a centre line of the gas control valve.

6. The gas control valve according to claim 1, wherein a valve gap formed on the valve seat is at least 5 mm in size when the gas control valve is in an open position.

7. The gas control valve according to claim 6, wherein the valve gap is fully opened when the valve body is moved from the closed position in the second axial direction by a maximum of 3 mm.

8. The gas control valve according to claim 1, wherein a sealing plate with a recess is provided between the stepper motor and the membrane, the shaft extending through said recess.

9. The gas control valve according to claim 1, wherein an attachment is arranged between the direct pressure regulator and the stepper motor, the stepper motor being fixed to said attachment.

10. The gas control valve according to claim 1, wherein the gas control valve is in its entirety an interchangeable module.

11. The gas control valve according to claim 1, wherein at least a part of the housing is a cartridge insert.

12. The gas control valve according to claim 11, wherein at least one shoulder is provided on an outer surface of the cartridge insert, at least one sealing member being arranged on said shoulder.

13. The gas control valve according to claim 11, wherein means for fixing the gas control valve to another component are provided on the cartridge insert or the attachment arranged between the direct pressure regulator and the stepper motor.

14. A gas control valve for controlling a quantity of gas to be supplied to a gas burner, the gas control valve comprising
   a direct pressure regulator having
   i. a housing with a gas inlet,
   ii. a hollow valve body held in the housing, said valve body being arranged so as to be able to move in a first and second axial direction and abutting a valve seat when the gas control valve is in a closed position, iii. at least one first spring which acts permanently on the valve body in the first axial direction, and
iv. a shaft which can be moved in the first and second axial directions and which engages with the valve body directly or indirectly by means of a second spring, and
an electronically controlled stepper motor which acts on the shaft and moves the shaft and thus the valve body in pre-defined longitudinal portions in the axial direction to open and close the gas control valve;
wherein the second spring is arranged inside the hollow valve body.

* * * * *